(12) United States Patent
Johnson

(10) Patent No.: US 7,856,693 B1
(45) Date of Patent: Dec. 28, 2010

(54) SELF-CLEANING EXTERIOR MIRROR FOR TRUCKS AND LIKE VEHICLES AND ASSOCIATED METHOD

(76) Inventor: Archie Johnson, 314 Thursday Dr., Butler, AL (US) 36904

( * ) Notice: Subject to any disclaimer, the term of this patent is extended or adjusted under 35 U.S.C. 154(b) by 773 days.

(21) Appl. No.: 11/810,820

(22) Filed: Jun. 7, 2007

(51) Int. Cl.
*B60S 1/56* (2006.01)

(52) U.S. Cl. ............... 15/250.003; 15/250.29; 15/250.24; 359/507; 359/871; 359/872; 359/881; 248/480

(58) Field of Classification Search ............ 15/250.003, 15/250.29, 250.24; 359/881, 865, 855, 850, 359/866, 871, 872, 876, 507; D12/187, 188; 248/475.1, 480, 279.1, 486
See application file for complete search history.

(56) References Cited

U.S. PATENT DOCUMENTS

| | | | |
|---|---|---|---|
| 2,671,630 A * | 3/1954 | Whitehead | 248/482 |
| 2,783,015 A * | 2/1957 | Kampa | 248/480 |
| 3,855,661 A | 12/1974 | Prince | |
| D316,841 S * | 5/1991 | Neff | D12/187 |
| 5,150,497 A | 9/1992 | Preik | |
| 5,760,980 A * | 6/1998 | Lang | 359/872 |
| 5,798,882 A * | 8/1998 | Lang | 359/872 |
| 6,032,323 A * | 3/2000 | Smith et al. | 15/250.003 |
| 6,654,982 B1 | 12/2003 | Cowan | |
| 6,764,207 B2 * | 7/2004 | Abalos et al. | 362/494 |
| 2003/0041405 A1 * | 3/2003 | Graf | 15/250.003 |

* cited by examiner

*Primary Examiner*—Gary K Graham

(57) ABSTRACT

A self-cleaning exterior mirror for trucks and like vehicles includes a rigid mounting bracket provided with axially opposed first and second ends respectively, and monolithically formed first, second, and third sections respectively. A plurality of coupling plates is integrally attached to the first and second ends of the bracket. The coupling plates are attached to the exterior of the existing vehicle for supporting the bracket above a ground surface. A substantially rectangular shaped frame is pivotally connected to the third section of the bracket, and a mirror is attached to the frame. A mechanism remotely cleans the mirror, and is attached to the frame.

2 Claims, 5 Drawing Sheets

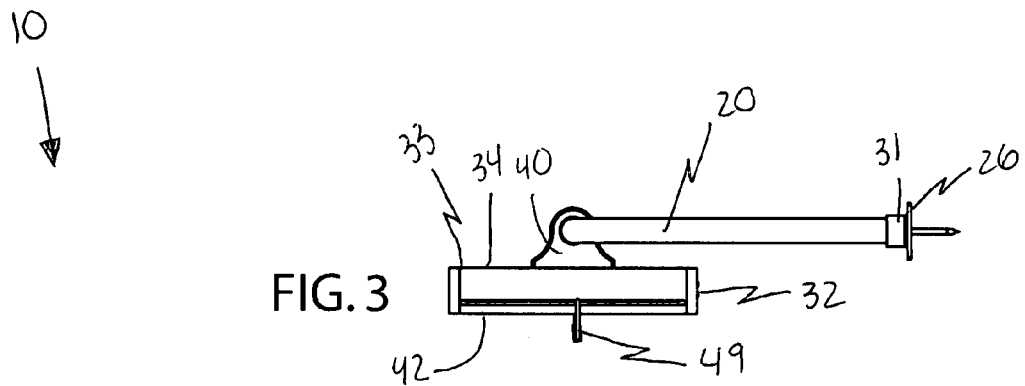
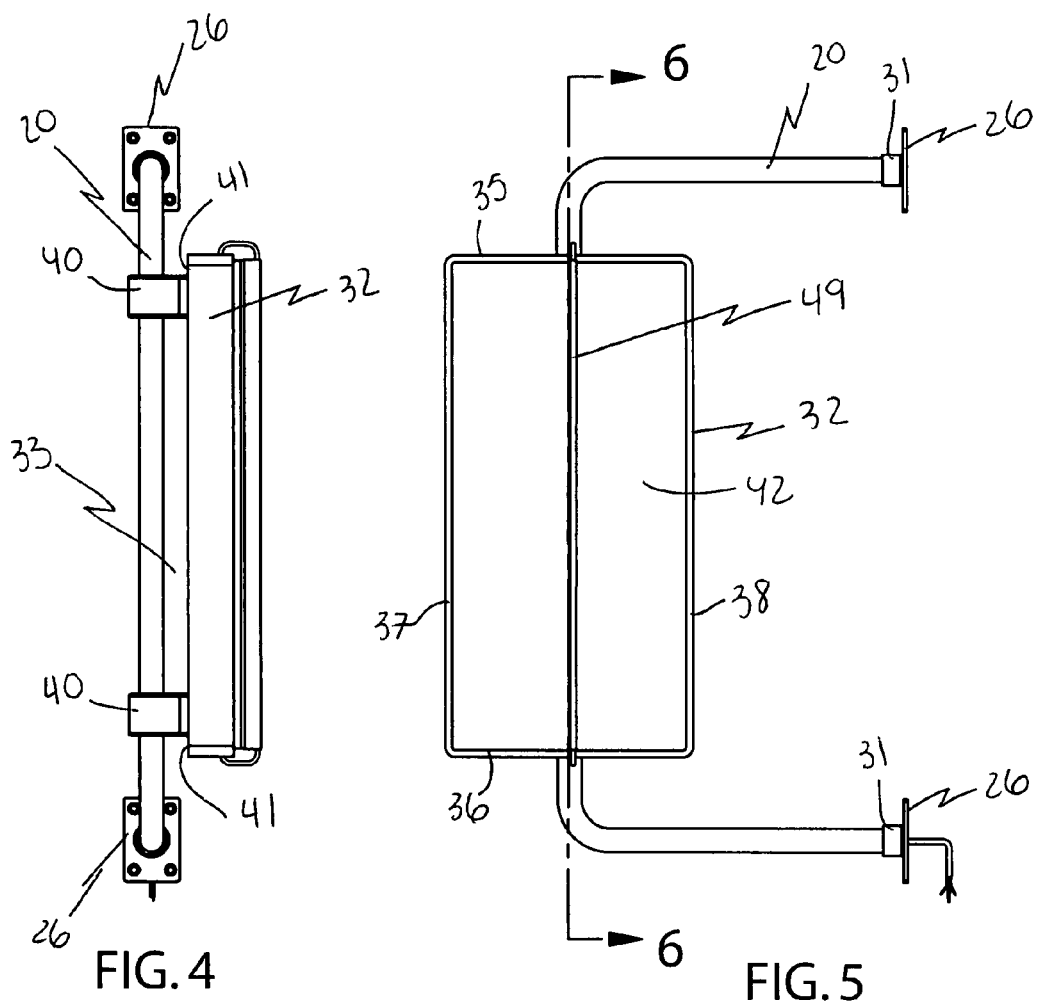

SELF-CLEANING EXTERIOR MIRROR FOR TRUCKS AND LIKE VEHICLES AND ASSOCIATED METHOD

CROSS REFERENCE TO RELATED APPLICATIONS

This application claims the benefit of U.S. Provisional Application No. 60/804,005, filed Jun. 6, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

TECHNICAL FIELD

This invention relates to mirror cleaning systems and, more particularly, to a self-cleaning exterior mirror system for assisting a user to remove water, snow, and debris from a surface of the vehicle mirror connected to the exterior of an existing vehicle while the user remains positioned within an interior of the existing vehicle.

PRIOR ART

Truck drivers rely on their side mounted rearview mirrors since most trucks have freight hauling portions which block the use of a rearview mirror mounted internally in the cab. Of course, it is very important that the driver get a good view of traffic behind him from his rearview mirror. However, being exposed to rain, snow, dew, dirt and road salt, the outside mirrors can become dirty and smeared, blocking the driver's view. Because the view through the outside mounted mirror is so critical to safe operation of the truck, the truck driver needs to keep the mirror clean.

One prior art example shows a rear view truck mirror and wiper assembly for improving the rear views for truckers by keeping the mirror clean and lighted. The rearview truck mirror and wiper assembly includes a first housing assembly including a first housing member having side, top, bottom, and back walls, and also including an open front, and also including a mirror being securely disposed at the open front of the first housing member with the first housing assembly being adapted to be securely mounted to mirror supports on a truck; and also includes a second housing member being attached to the first housing member and having top, bottom, front and side walls; and further includes a wiper drive assembly being disposed in the second housing member and including a track member and a two-directional motor; and also includes a wiper assembly being attached to the wiper drive assembly and including a wiper member being movable upon the mirror; and further includes a heating element being disposed in the first housing member; and also includes a light-emitting assembly also being disposed in the first housing member. Unfortunately this prior art example requires a multitude of parts which may become damaged or lost, thereby rendering the invention useless for its intended purpose.

Another prior art example shows a truck mirror wiper for a truck having a side mirror to be wiped and a side window glass which may be raised and lowered and through which a driver looks to view the mirror. A clamp clamps the truck mirror wiper to the top of the window glass, and a bracket extends from the clamp to the proximity of the mirror. The bracket includes two lengths of rod, each having a threaded end, and a turnbuckle with two opposed threaded bores into which the two lengths of threaded rod may be screwed a desired distance to adjust the bracket length. A blade support has a pivotal connection to one of the rods, and a wiper blade affixed to the blade support is in contact with the mirror so that the azimuthal orientation of the blade may be matched to the azimuthal orientation of the mirror. When the driver lowers or raises the window glass, the wiper blade passes over the mirror to wipe it. Unfortunately this prior art example requires the user to manually manipulate an existing vehicle window in order to effectuate cleaning of the mirror. Such manual manipulation of the existing vehicle window may be undesirable during inclement weather conditions.

Accordingly, a need remains for a self-cleaning exterior mirror for trucks and like vehicles and associated method in order to overcome the above-noted shortcomings. The present invention satisfies such a need by providing a system that is convenient and easy to use, is lightweight yet durable in design, and assists a user to remove water, snow, and debris from a surface of the vehicle mirror connected to the exterior of an existing vehicle while the user remains positioned within an interior of the existing vehicle. The system increases the driving safety of large trucks and RVs, and can reduce the number of accidents that result from mirrors being dirty. The present invention is simple to use, inexpensive, and designed for many years of repeated use.

BRIEF SUMMARY OF THE INVENTION

In view of the foregoing background, it is therefore an object of the present invention to provide a system for a self-cleaning exterior mirror for trucks and like vehicles and associated method. These and other objects, features, and advantages of the invention are provided by a self-cleaning vehicle mirror system for removing water, snow and debris from a surface of the vehicle mirror while the user remains positioned within an interior of the vehicle.

The system includes a rigid mounting bracket provided with axially opposed first and second ends respectively, and monolithically formed first, second, and third sections respectively. Such a third section of the bracket is conveniently located intermediate of the respective first and second sections of the bracket and equidistantly offset from the coupling plates (herein described below). The third section further has a longitudinal length oriented perpendicular to respective longitudinal lengths of each of the respective first and second sections. Such a longitudinal length of the third section is greater than the respective longitudinal lengths of the first and second sections respectively while the respective longitudinal lengths of the first and second sections are equal.

The system further includes a plurality of coupling plates integrally attached to the first and second ends of the bracket respectively. Such coupling plates are advantageously directly attached to the exterior of the existing vehicle for supporting the bracket above a ground surface during operating conditions. Each of such coupling plates conveniently includes a substantially square-shaped and planar base member provided with upper and lower surfaces respectively. A plurality of threaded apertures is effectively formed in opposed corners of the base member and penetrate therethrough. Each of such apertures has a centrally registered axis oriented perpendicular to the upper surface of the base member.

The coupling plates further include a hollow cylindrical tube integrally attached to the upper surface of the base member. Such a tube is located in a center region of the base member and effectively extends outwardly and away therefrom. The tube has a longitudinal length registered parallel to the centrally registered axis of each of the apertures of the base member. The tube also has a diameter that is greater than a diameter of the first and second ends of the bracket respectively such that the respective first and second ends of the bracket statically interfit within an associated one of the tubes during operating conditions. The tubes effectively prohibit the respective first and second ends of the bracket from prematurely and undesirably separating from the tubes during operating conditions.

The system further includes a substantially rectangular shaped frame pivotally connected to the third section of the bracket. Such a frame includes a planar base that has a rear wall and an open front face respectively. Such a base includes monolithically formed first, second, third, and fourth walls advantageously located along an outer perimeter of the base and effectively extending away therefrom such that a compartment is formed therebetween.

The frame further includes a plurality of linear slots monolithically formed in the first and second walls respectively. The first and second walls are advantageously located at opposed longitudinal ends of the base and further have respective longitudinal lengths registered parallel with each other. Each of such slots has a longitudinal length registered parallel to the rear wall of the base, and that is less than a lateral width of the base.

The frame further includes a plurality of anchors monolithically formed in the rear wall of the base and effectively extending outwardly therefrom. Each of such anchors has a central opening formed therein with a centrally registered axis oriented parallel with a longitudinal length of the base. Each of the anchors is attached to the rear wall of the base at a lateral midpoint thereof, and each of the anchors is conveniently disposed adjacent to the respective opposed ends of the base and spaced from each other.

The third section of the bracket is pivotally interfitted within each of the anchors such that the third section effectively penetrates the anchors simultaneously and independently during operating conditions. The base is pivotal about the third section along a fulcrum axis defined along the longitudinal length of the base and about the lateral midpoint of the base.

The system further includes a mirror attached directly to the frame. Such a mirror interfits within the open front face of the frame, and the mirror has an outer perimeter statically abutted against inner surfaces of each of the first, second, third, and fourth walls respectively. Such a mirror is advantageously spaced from the base such that a hollow chamber is effectively formed within a region defined between the mirror and the first, second, third, and fourth walls and the base respectively.

The system further includes a mechanism for remotely cleaning the mirror. Such a mechanism is attached to the frame and conveniently includes a reversible power motor housed within the hollow chamber and directly attached to the inner surface of the fourth wall.

The remote cleaning mechanism further includes first and second gear wheels having respective outer circumferences formed in a saw tooth pattern. Such a first gear wheel is directly and rotatably attached to a bottom end of the motor and has a bottom surface registered perpendicular to the inner surface of the fourth wall. Such a second gear wheel is directly and rotatably attached to the inner surface of the third wall and oppositely spaced from the first gear wheel.

The remote cleaning mechanism further includes a flexible cable looped about each of the first and second gear wheels simultaneously. Such a cable has a longitudinal length registered parallel to the respective longitudinal lengths of the first and second walls during operating conditions. The cable has an inner surface formed in a saw tooth pattern such that the saw tooth pattern of the cable effectively interfits within the respective saw tooth patterns of each of the first and second gear wheels respectively during operating conditions in such a manner that a rotational force applied to the first gear wheel via the motor is advantageously transferred to the second gear wheel via the cable.

The remote cleaning mechanism further includes a squeegee including a planar blade provided with axially opposed upper and lower ends respectively. Such a blade has a longitudinal length registered parallel with the longitudinal length of the base and equal to the longitudinal length of the base. The blade contacts an outer surface of the mirror for cleaning purposes during operating conditions. Each of such respective upper and lower ends of the blade has a hole monolithically formed therein, and each of the holes has a longitudinal length registered parallel with the longitudinal length of the blade.

The squeegee further includes a driven rod provided with axially opposed first and second ends respectively. Such a rod simultaneously penetrates through the slots of the first and second walls respectively. Such a first end of the rod is removably attached directly to the upper end of the blade while the second end of the rod is removably attached directly to the lower end of the blade during operating conditions. The rod has a longitudinal axis oriented perpendicular to the longitudinal length of the blade. The cable is directly attached to a medial portion of the rod and advantageously spaced from the blade. The cable effectively moves the rod along a bi-directional linear path defined by the first and second slots such that the blade is alternately pushed and pulled along a major portion of the outer surface of the mirror during operating conditions.

The remote cleaning mechanism further includes a switch electrically coupled to the motor. Such a switch is conveniently located within the interior portion of the existing vehicle such that the user can effectively actuate the system from the interior of the existing vehicle. The motor is electrically coupled to the switch and an existing power source of the vehicle respectively.

A method for removing water, snow, and debris from a surface of a vehicle mirror while the user remains positioned within an interior of the vehicle includes the steps of providing a rigid mounting bracket that has axially opposed first and second ends respectively and monolithically formed first, second, and third sections respectively, attaching a plurality of coupling plates to the first and second ends of the bracket respectively, pivotally connecting a substantially rectangular shaped frame to the third section of the bracket, directly attaching a mirror to the frame, and cleaning the mirror while the mirror is attached to the frame.

The method of directly attaching a mirror to the frame includes the step of interfitting the mirror within the open front face of the frame. The mirror has an outer perimeter statically abutted against inner surfaces of each of the first, second, third, and fourth walls respectively. The mirror is spaced from the base such that a hollow chamber is formed within a region defined between the mirror and the first, second, third, and fourth walls and the base respectively.

The method of cleaning the mirror includes the steps of housing a reversible power motor within the hollow chamber by directly attaching the motor to the inner surface of the fourth wall, and providing first and second gear wheels. Each of the gear wheels has outer circumferences formed in a saw tooth pattern, and the first gear wheel is directly and rotatably attached to a bottom end of the motor. The first gear wheel has a bottom surface registered perpendicular to the inner surface of the fourth wall. The second gear wheel is directly and rotatably attached to the inner surface of the third wall and oppositely spaced from the first gear wheel.

The method of cleaning the mirror further includes the steps of looping a flexible cable about each of the first and second gear wheels simultaneously. The cable has a longitudinal length registered parallel to the respective longitudinal lengths of the first and second walls during operating conditions. The cable has an inner surface formed in a saw tooth pattern such that the saw tooth pattern of the cable interfits within the respective saw tooth patterns of each of the first and second gear wheels respectively during operating conditions in such a manner that a rotational force applied to the first gear wheel via the motor is transferred to the second gear wheel via the cable.

The method of cleaning the mirror further includes the steps of providing a squeegee including a planar blade provided with axially opposed upper and lower ends respectively. The blade has a longitudinal length registered parallel with the longitudinal length of the base, and the longitudinal length of the blade is equal to the longitudinal length of the base. Each of the respective upper and lower ends has a hole monolithically formed therein, and each of the holes has a longitudinal length registered parallel with the longitudinal length of the blade. The blade contacts an outer surface of the mirror for cleaning purposes during operating conditions.

The method of cleaning the mirror further includes the steps of providing a driven rod provided with axially opposed first and second ends respectively. The rod simultaneously penetrates through the slots of the first and second walls respectively. The first end of the rod is removably attached directly to the upper end of the blade while the second end of the rod is removably attached directly to the lower end of the blade during operating conditions. The rod has a longitudinal axis oriented perpendicular to the longitudinal length of the blade, and the cable is directly attached to a medial portion of the rod and spaced from the blade.

The method of cleaning the mirror further includes the steps of providing a switch electrically coupled to the motor. The switch is located within the interior portion of the existing vehicle such that the user can actuate the system from the interior of the existing vehicle. The motor is electrically coupled to the switch and an existing power source of the vehicle respectively. The steps further include biasing the rod along a bi-directional linear path defined by the first and second slots such that the blade is alternately pushed and pulled along a major portion of the outer surface of the mirror during operating conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor, is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a top plan view of the system shown in FIG. 1;

FIG. 4 is a side elevational view of the system shown in FIG. 1;

FIG. 5 is a front elevational view of the system shown in FIG. 1;

DETAILED DESCRIPTION OF THE INVENTION

Figure 1:
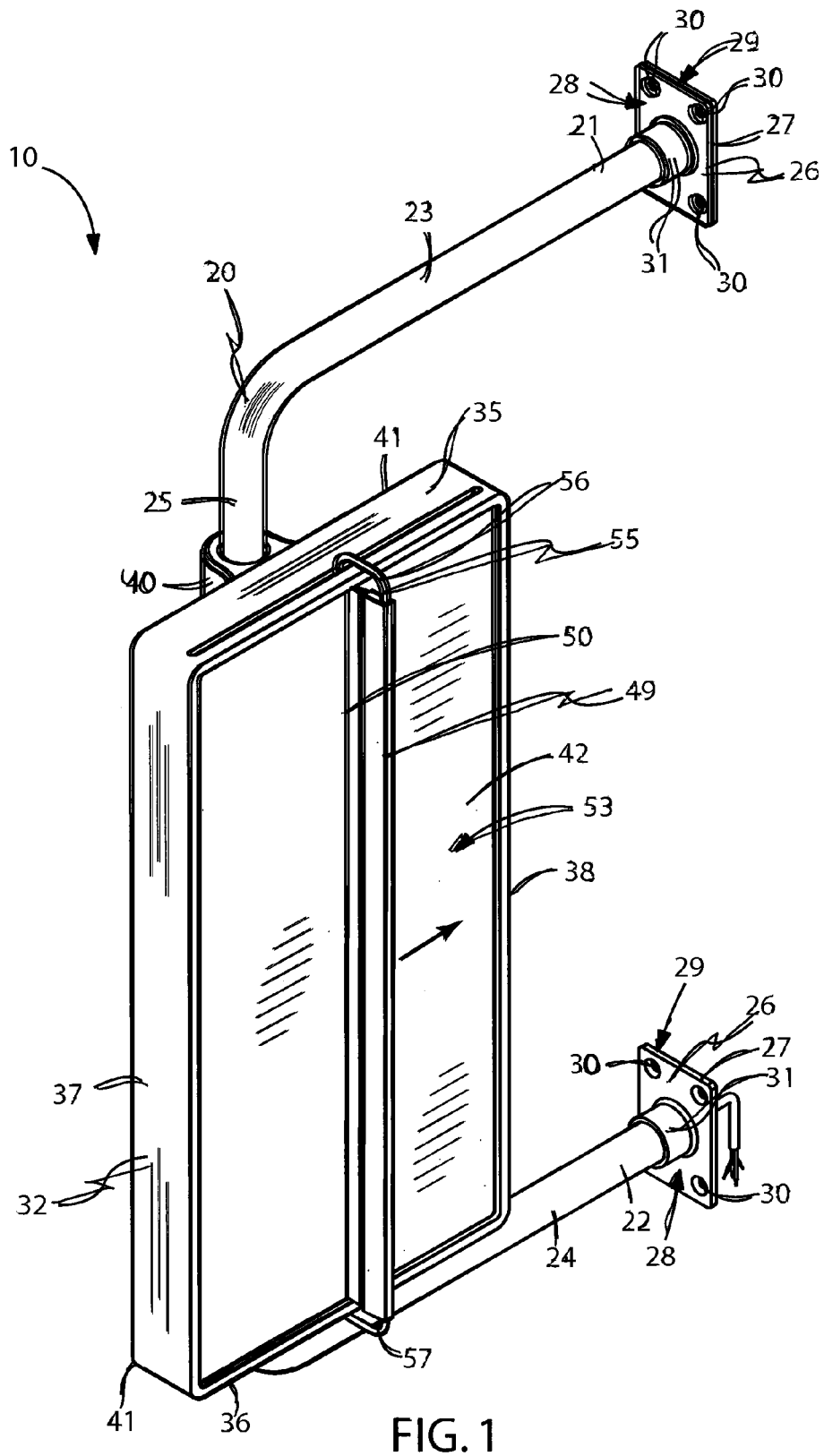
FIG. 1 is a perspective view of the system, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-7 by the reference numeral 10 and is intended to provide a self-cleaning exterior mirror for trucks and like vehicles and associated method. It should be understood that the system and method 10 may be used to clean many different types of vehicle mirrors and should not be limited in use to cleaning only those types of mirrors described herein.

Referring initially to FIGS. 1, 2, 3, 4, 5 and 6, the system 10 includes a rigid mounting bracket 20 provided with axially opposed first 21 and second 22 ends respectively, and monolithically formed first 23, second 24, and third 25 sections respectively. Such a third section 25 of the bracket 20 is located intermediate of the respective first and second sections 23, 24 of the bracket 20 and equidistantly offset from the coupling plates 26 (herein described below). The third section 25 further has a longitudinal length oriented perpendicular to respective longitudinal lengths of each of the respective first and second sections 23, 24. Such a longitudinal length of the third section 25 is greater than the respective longitudinal lengths of the first and second sections 23, 24 respectively while the respective longitudinal lengths of the first and second sections 23, 24 are equal.

Again referring to FIGS. 1 through 6, the system 10 further includes a plurality of coupling plates 26 integrally attached to the first and second ends 21, 22 of the bracket 20 respectively. Such coupling plates 26 are directly attached to the exterior of the existing vehicle, without the use of intervening elements, for supporting the bracket 20 above a ground surface during operating conditions. The coupling plates 26 allow the user to position the bracket 20 as desired along the exterior of the vehicle. Each of such coupling plates 26 includes a substantially square-shaped and planar base member 27 provided with upper 28 and lower 29 surfaces respectively. A plurality of threaded apertures 30 is formed in opposed corners of the base member 27 and penetrate therethrough. Each of such apertures 30 has a centrally registered axis oriented perpendicular to the upper surface 28 of the base member 27.

Yet again referring to FIGS. 1 through 6, the coupling plates 26 further include a hollow cylindrical tube 31 integrally attached to the upper surface 28 of the base member 27. Such a tube 31 is located in a center region of the base member 27 and extends outwardly and away therefrom. The tube 31 has a longitudinal length registered parallel to the centrally registered axis of each of the apertures 30 of the base member 27. The tube 31 also has a diameter that is greater than a diameter of the first and second ends 21, 22 of the bracket 20 respectively, which is essential such that the respective first and second ends 21, 22 of the bracket 20 statically interfit within an associated one of the tubes 31 during operating conditions. The tubes 31 prohibit the respective first and second ends 21, 22 of the bracket 20 from prematurely and undesirably separating from the tubes 31 during operating conditions. The tubes 31 also house the bracket 20 in the proper position related to respective vertical and horizontal planes during operating conditions.

Still referring to FIGS. 1 through 6, the system 10 further includes a substantially rectangular shaped frame 32 pivotally connected to the third section 25 of the bracket 20. Such a frame 32 includes a planar base 33 that has a rear wall 34 and an open front face 65 respectively. Such a base 33 includes monolithically formed first 35, second 36, third 37, and fourth 38 walls located along an outer perimeter of the base 33 and extending away therefrom, which is critical such that a compartment is formed therebetween.

The frame 32 further includes a plurality of linear slots 39 monolithically formed in the first and second walls 35, 36 respectively. The first and second walls 35, 36 are located at opposed longitudinal ends 41 of the base 33 and further have respective longitudinal lengths registered parallel with each other. Each of such slots 39 has a longitudinal length registered parallel to the rear wall 34 of the base 33, and that is less than a lateral width of the base 33.

The frame 32 further includes a plurality of anchors 40 monolithically formed in the rear wall 34 of the base 33 and extending outwardly therefrom. Each of such anchors 40 has a central opening formed therein with a centrally registered axis oriented parallel with a longitudinal length of the base 33. Each of the anchors 40 is attached to the rear wall 34 of the base 33 at a lateral midpoint thereof, and each of the anchors 40 is disposed adjacent to the respective opposed ends 41 of the base and spaced from each other. The anchors 40 allow the user to manually position the frame 32 for optimal viewing during operating conditions.

The third section 25 of the bracket 20 is pivotally interfitted within each of the anchors 40, which is crucial such that the third section 25 penetrates the anchors 40 simultaneously and independently during operating conditions. The base 33 is pivotal about the third section 25 along a fulcrum axis defined along the longitudinal length of the base 33 and about the lateral midpoint of the base 33. Such a pivoting function allows the user to manually position the frame 32 for optimal viewing with a minimum of expended energy.

Referring to FIGS. 1 and 5, the system 10 further includes a mirror 42 attached directly to the frame 32, without the use of intervening elements. Such a mirror 42 interfits within the open front face 65 of the frame 32, and the mirror 42 has an outer perimeter statically abutted against inner surfaces of each of the first, second, third, and fourth walls 35, 36, 37, 38 respectively. Such a static abutment prohibits the mirror 42 from prematurely and undesirably separating from the frame 32 during operating conditions. Such a mirror 42 is spaced from the base 33, which is necessary such that a hollow chamber 43 is formed within a region defined between the mirror 42 and the first, second, third, and fourth walls 35, 36, 37, 38 and the base 33 respectively.

Figure 2:
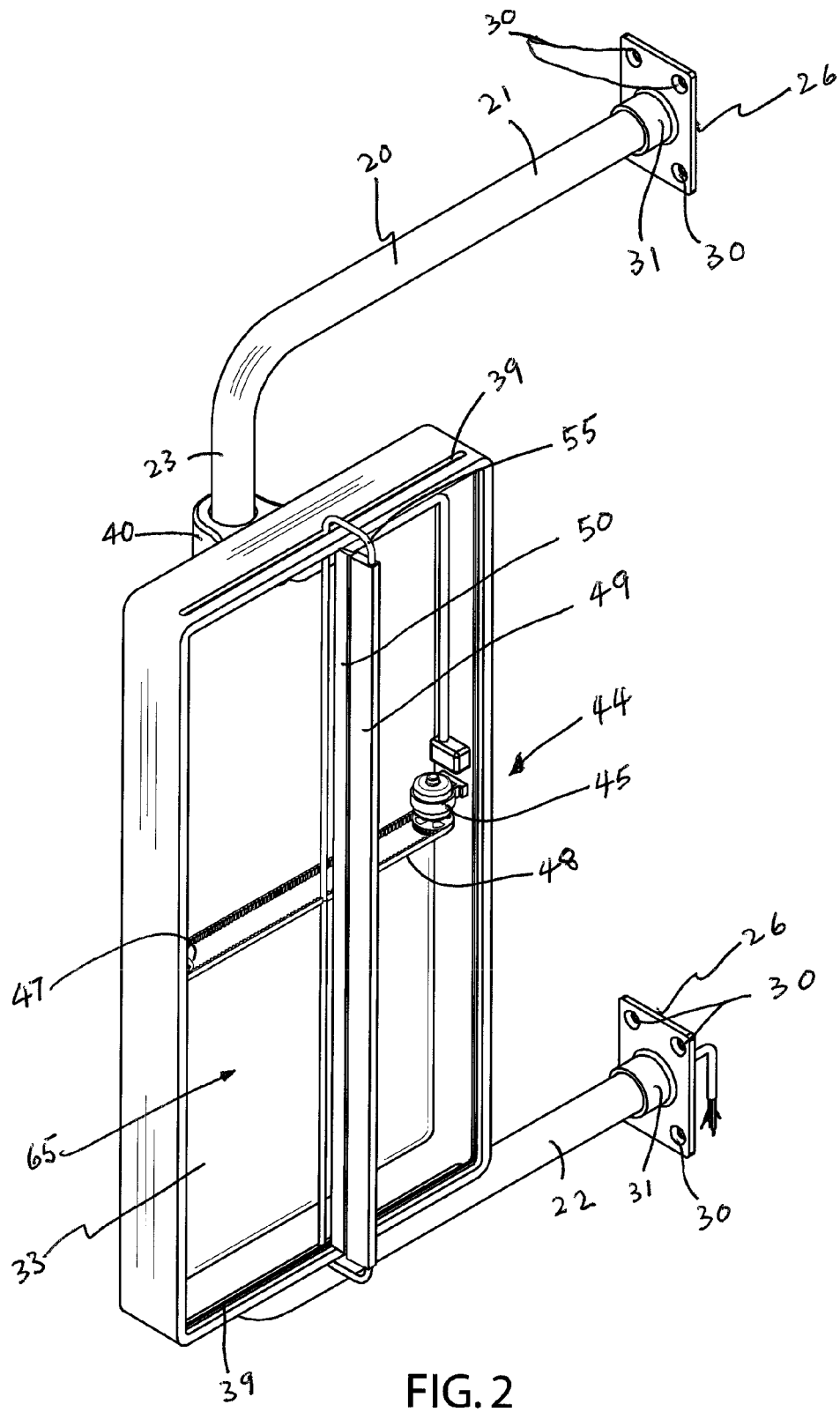
FIG. 2 is a perspective view of the system shown in FIG. 1, showing the mirror removed from the frame.
Figure 6:
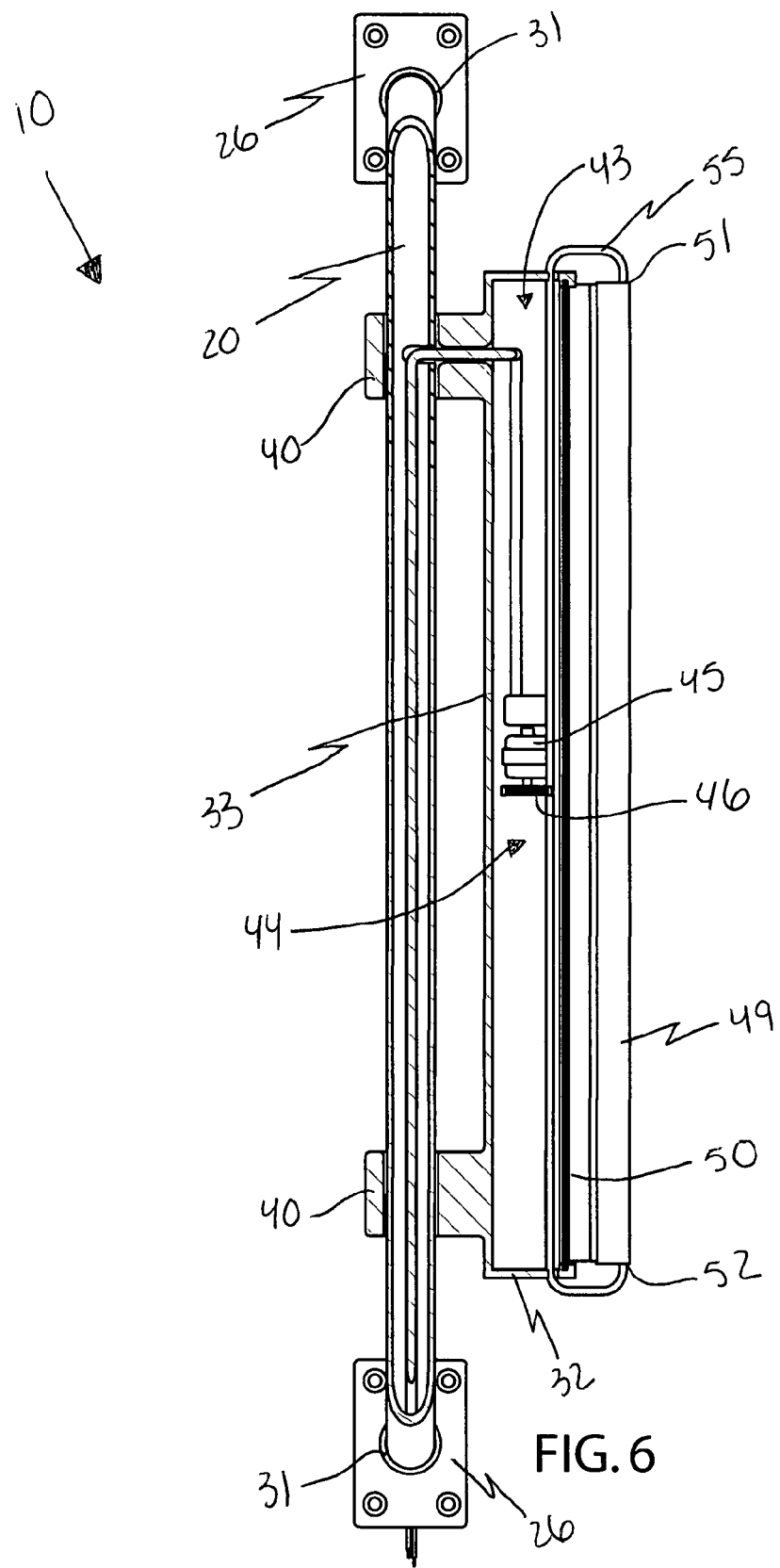
FIG. 6 is a cross sectional view of the system shown in FIG. 5, taken along line 6-6.
Figure 7:
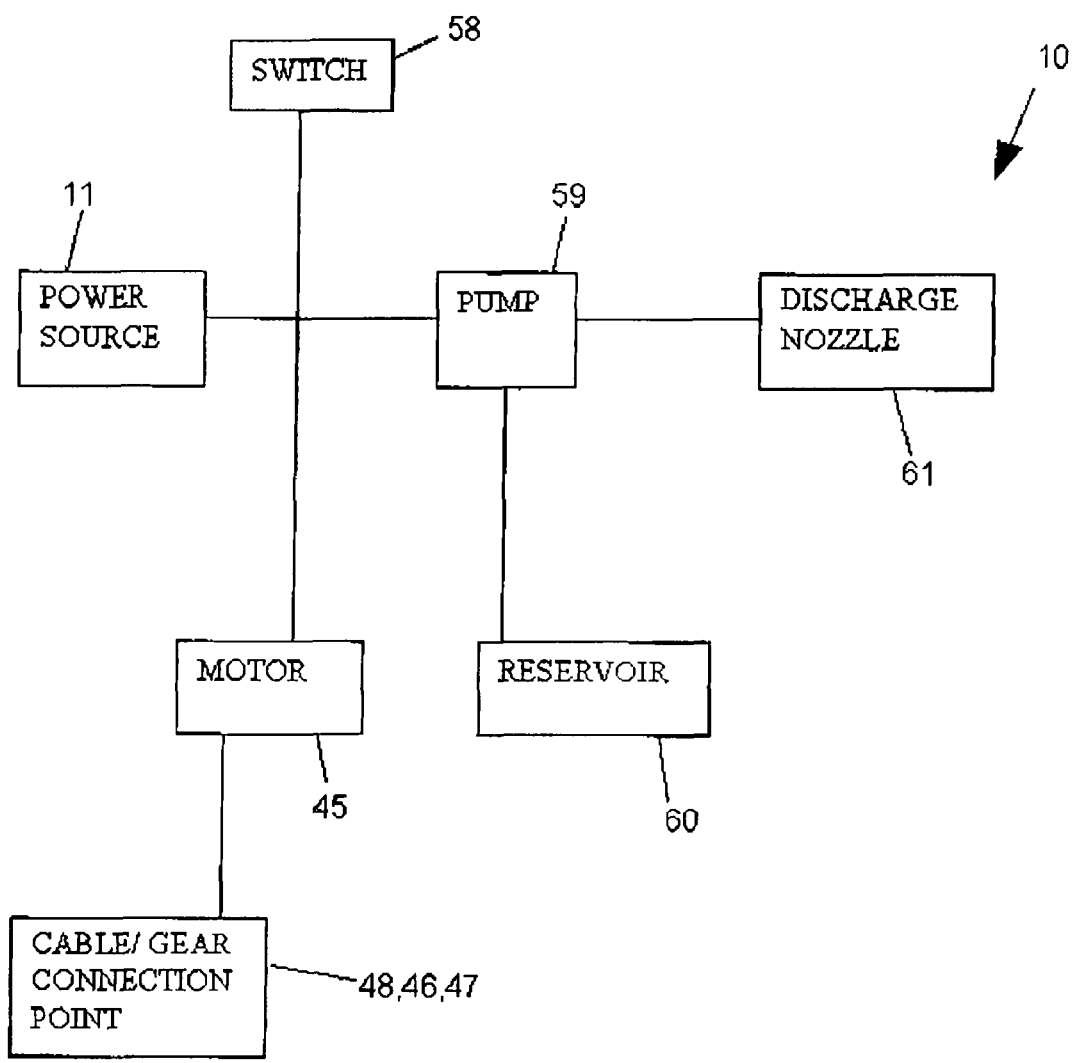
FIG. 7 is a schematic block diagram of the system.

Referring to FIGS. 2, 6 and 7, the system 10 further includes a mechanism 44 for remotely cleaning the mirror 42. Such a mechanism 44 is attached to the frame 32 and includes a reversible power motor 45 housed within the hollow chamber 43 and directly attached to the inner surface of the fourth wall 38, without the use of intervening elements. Such placement of the motor 45 within the hollow chamber 43 protects the motor 45 from damage caused by harsh environmental conditions.

Referring to FIGS. 2 and 6, the remote cleaning mechanism 44 further includes first 46 and second 47 gear wheels having respective outer circumferences formed in a saw tooth pattern. Such a first gear wheel 46 is directly and rotatably attached to a bottom end of the motor 45, without the use of intervening elements, and has a bottom surface registered perpendicular to the inner surface of the fourth wall 38. Such a second gear wheel 47 is directly and rotatably attached to the inner surface of the third wall 37, without the use of intervening elements, and oppositely spaced from the first gear wheel 46.

Referring to FIG. 2, the remote cleaning mechanism 44 further includes a flexible cable 48 looped about each of the first and second gear wheels 46, 47 simultaneously. Such a cable 48 has a longitudinal length registered parallel to the respective longitudinal lengths of the first and second walls 35, 36 during operating conditions. The cable 48 has an inner surface formed in a saw tooth pattern, which is important such that the saw tooth pattern of the cable 48 interfits within the respective saw tooth patterns of each of the first and second gear wheels 46, 47 respectively during operating conditions in such a manner that a rotational force applied to the first gear wheel 46 via the motor 45 is transferred to the second gear wheel 47 via the cable 48. Such respective saw tooth patterns of the first and second gear wheels 46, 47 and the cable 48 prohibit the cable 48 from slipping off of the first and second gear wheels 46, 47 respectively during operating procedures.

Still referring to FIGS. 1 through 6, the remote cleaning mechanism 44 further includes a squeegee 49 including a planar blade 50 provided with axially opposed upper 51 and lower 52 ends respectively. Such a blade 50 has a longitudinal length registered parallel with the longitudinal length of the base 33 and equal to the longitudinal length of the base 33. The blade 50 contacts an outer surface 53 of the mirror 42 for cleaning purposes during operating conditions. Each of such respective upper and lower ends 51, 52 of the blade 50 has a hole monolithically formed therein, and each of the holes has a longitudinal length registered parallel with the longitudinal length of the blade 50.

Referring to FIGS. 1, 2, 4 and 6, the squeegee 49 further includes a driven rod 55 provided with axially opposed first 56 and second 57 ends respectively. Such a rod 55 simultaneously penetrates through the slots 39 of the first and second walls 35, 36 respectively, and into the hollow chamber 43. Such a first end 56 of the rod 55 is removably attached directly to the upper end 51 of the blade 50, without the use of intervening elements, while the second end 57 of the rod 55 is removably attached directly to the lower end 52 of the blade 50, without the use of intervening elements, during operating conditions. Such removability allows the user to easily replace a worn or damaged blade 50 as needed.

The rod 55 has a longitudinal axis oriented perpendicular to the longitudinal length of the blade 50. The cable 48 is directly attached to a medial portion of the rod 55, without the use of intervening elements, and spaced from the blade 50. The cable 48 moves the rod 55 along a bi-directional linear path defined by the slots 39 such that the blade 50 is alternately pushed and pulled along a major portion of the outer surface 53 of the mirror 42 during operating conditions. Such alternate pushing and pulling of the blade 50 along the outer surface 53 of the mirror 42 ensures that the entire outer surface 53 of the mirror 42 is repeatedly cleaned as needed.

Referring to FIG. 7, the remote cleaning mechanism 44 further includes a switch 58 electrically coupled to the motor 45. Such a switch 58 is located within the interior portion of the existing vehicle, which is essential such that the user can actuate the system 10 from the interior of the existing vehicle. This allows the user to actuate the system 10 while the vehicle is in motion. The motor 45 is electrically coupled to the switch 58 and an existing power source 11 of the vehicle respectively.

Again referring to FIG. 7, the remote cleaning mechanism 44 further includes a pump 59 directly connected to the switch 58 and the motor 45 and the power supply source 11 respectively. The pump 59 has a liquid reservoir 60 attached thereto for housing a cleaning agent used to help remove the water, snow, and debris from the outer surface 53 of the mirror 42. A discharge nozzle 61 is connected to the pump 59 and disposed subjacent to the mirror 42 such that the discharge nozzle 61 directs a quantity of the cleaning agent directly onto the outer surface 53 of the mirror 42 during operating conditions.

Having the switch 58 located within the interior of the vehicle provides the unexpected benefit of allowing the user to actuate the system 10 while the vehicle is in motion. In addition, the alternate pushing and pulling of the blade 50 across the outer surface 53 of the mirror 42 ensures repeated cleaning of the outer surface 53 of the mirror 42 as needed during operating conditions, thereby overcoming the prior art shortcomings.

A method 10 for removing water, snow, and debris from a surface 53 of a vehicle mirror 42 while the user remains positioned within an interior of the vehicle includes the steps of providing a rigid mounting bracket 20 that has axially opposed first 21 and second 22 ends respectively and monolithically formed first 23, second 24, and third 25 sections respectively, attaching a plurality of coupling plates 26 to the first 21 and second 22 ends of the bracket 20 respectively, pivotally connecting a substantially rectangular shaped frame 32 to the third section 25 of the bracket 20, directly attaching a mirror 42 to the frame 32, without the use of intervening elements, and cleaning the mirror 42 while the mirror 42 is attached to the frame 32.

The method 10 of directly attaching a mirror 42 to the frame 32 includes the step of interfitting the mirror 42 within the open front face 65 of the frame 32. The mirror 42 has an outer perimeter statically abutted against inner surfaces of each of the first, second, third, and fourth walls 35, 36, 37, 38 respectively. The mirror 42 is spaced from the base 33 such that a hollow chamber 43 is formed within a region defined between the mirror 42 and the first, second, third, and fourth walls 35, 36, 37, 38 and the base 33 respectively.

The method 10 of cleaning the mirror 42 includes the steps of housing a reversible power motor 45 within the hollow chamber 43 by directly attaching the motor 45 to the inner surface of the fourth wall 38, without the use of intervening elements, and providing first 46 and second 47 gear wheels. Each of the first and second gear wheels 46, 47 has outer circumferences formed in a saw tooth pattern, and the first gear wheel 46 is directly and rotatably attached to a bottom end of the motor 45, without the use of intervening elements. The first gear wheel 46 has a bottom surface registered perpendicular to the inner surface of the fourth wall 38. The second gear wheel 47 is directly and rotatably attached to the inner surface of the third wall 37, without the use of intervening elements, and oppositely spaced from the first gear wheel 46.

The method 10 of cleaning the mirror 42 further includes the steps of looping a flexible cable 48 about each of the first and second gear wheels 46, 47 simultaneously. The cable 48 has a longitudinal length registered parallel to the respective longitudinal lengths of the first and second walls 35, 36 during operating conditions. The cable 48 has an inner surface formed in a saw tooth pattern such that the saw tooth pattern of the cable 48 interfits within the respective saw tooth patterns of each of the first and second gear wheels 46, 47 respectively during operating conditions in such a manner that a rotational force applied to the first gear wheel 46 via the motor 45 is transferred to the second gear wheel 47 via the cable 48.

The method 10 of cleaning the mirror 42 further includes the steps of providing a squeegee 49 including a planar blade 50 provided with axially opposed upper 51 and lower 52 ends respectively. The blade 50 has a longitudinal length registered parallel with the longitudinal length of the base 33, and the longitudinal length of the blade 50 is equal to the longitudinal length of the base 33. Each of the respective upper and lower ends 51, 52 has a hole monolithically formed therein, and each of the holes has a longitudinal length registered parallel with the longitudinal length of the blade 50. The blade 50 contacts an outer surface 53 of the mirror 42 for cleaning purposes during operating conditions.

The method 10 of cleaning the mirror 42 further includes the steps of providing a driven rod 55 provided with axially opposed first 56 and second 57 ends respectively. The rod 55 simultaneously penetrates through the slots 39 of the first and second walls 35, 36 respectively. The first end 56 of the rod 55 is removably attached directly to the upper end 51 of the blade 50, without the use of intervening elements, while the second end 57 of the rod 55 is removably attached directly to the lower end 52 of the blade 50, without the use of intervening elements, during operating conditions. The rod 55 has a longitudinal axis oriented perpendicular to the longitudinal length of the blade 50, and the cable 48 is directly attached to a medial portion of the rod 55, without the use of intervening elements, and spaced from the blade 50.

The method 10 of cleaning the mirror 42 further includes the steps of providing a switch 58 electrically coupled to the motor 45. The switch 58 is located within the interior portion of the existing vehicle such that the user can actuate the system 10 from the interior of the existing vehicle. The motor 45 is electrically coupled to the switch 58 and an existing power source 11 of the vehicle respectively. The steps further include biasing the rod 55 along a bi-directional linear path defined by the slots 39 such that the blade 50 is alternately pushed and pulled along a major portion of the outer surface 53 of the mirror 42 during operating conditions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A self-cleaning vehicle mirror system for removing water, snow and debris from a surface of the vehicle mirror while the user remains positioned within an interior of the vehicle, said self-cleaning vehicle mirror system comprising:

a rigid mounting bracket provided with axially opposed first and second ends respectively, said bracket being provided with monolithically formed first, second, and third sections respectively;

a plurality of coupling plates integrally attached to said first and second ends of said bracket respectively;

a substantially rectangular shaped frame pivotally connected to said third section of said bracket;

a mirror attached directly to said frame;

means for remotely cleaning said mirror, said means being attached to said frame;

wherein said third section of said bracket is located intermediate of said respective first and second sections of said bracket and equidistantly offset from said coupling plates, said third section further having a longitudinal length oriented perpendicular to respective longitudinal lengths of each of said respective first and second sections, said longitudinal length of said third section being greater than said respective longitudinal lengths of said first and second sections respectively while said respective longitudinal lengths of said first and second sections are equal;

wherein each of said coupling plates comprises:

a substantially square-shaped and planar base member, said base member being provided with upper and lower surfaces respectively;

a plurality of threaded apertures formed in opposed corners of said base member and penetrating therethrough, each of said apertures having a centrally registered axis oriented perpendicular to said upper surface of said base member;

a hollow cylindrical tube integrally attached to said upper surface of said base member, said tube being located in a center region of said base member and extending outwardly and away therefrom, said tube having a longitudinal length registered parallel to said centrally registered axis of each of said apertures of said base member, said tube having a diameter that is greater than a diameter of said first and second ends of said bracket respectively such that said respective first and second ends of said bracket statically interfit within an associated one of said tubes during operating conditions;

wherein said tubes prohibit said respective first and second ends of said bracket from prematurely and undesirably separating from said tubes during operating conditions;

wherein said frame comprises:

a planar base having a rear wall and an open front face;

said base including monolithically formed first, second, third, and fourth walls, said walls being located along an outer perimeter of said base and extending away from said base such that a compartment is formed therebetween;

a plurality of linear slots monolithically formed in said first and second walls respectively, said first and second walls being located at opposed longitudinal ends of said base and further having respective longitudinal lengths registered parallel with each other, each of said slots having a longitudinal length registered parallel to said rear wall of said base, each of said slots having a longitudinal length that is less than a lateral width of said base;

a plurality of anchors monolithically formed in said rear wall of said base and extending outwardly therefrom, each of said anchors having a central opening formed therein, each of said anchors having a centrally registered axis oriented parallel with a longitudinal length of said base, each of said anchors being attached to said rear wall of said base at a lateral midpoint thereof, each of said anchors being disposed adjacent to said respective opposed ends of said base and spaced from each other;

wherein said third section of said bracket is pivotally interfitted within each of said anchors such that said third section penetrates said anchors simultaneously and independently during operating conditions;

wherein said base is pivotal about said third section along a fulcrum axis defined along said longitudinal length of said base and about said lateral midpoint of said base;

wherein said mirror interfits within said open front face of said frame, said mirror having an outer perimeter statically abutted against inner surfaces of each of said first, second, third, and fourth walls respectively, said mirror being spaced from said base such that a hollow chamber is formed within a region defined between said mirror and said first, second, third, and fourth walls and said base respectively;

wherein said self-cleaning means comprises:

a reversible power motor housed within said hollow chamber, said motor being directly attached to said inner surface of said fourth wall;

first and second gear wheels, each of said gear wheels having outer circumferences formed in a saw tooth pattern, said first gear wheel being directly and rotatably attached to a bottom end of said motor, said first gear wheel having a bottom surface registered perpendicular to said inner surface of said fourth wall, said second gear wheel being directly and rotatably attached to said inner surface of said third wall and oppositely spaced from said first gear wheel;

a flexible cable looped about each of said first and second gear wheels simultaneously, said cable having a longitudinal length registered parallel to said respective longitudinal lengths of said first and second walls during operating conditions, said cable having an inner surface formed in a saw tooth pattern such that said saw tooth pattern of said cable interfits within said respective saw tooth patterns of each of said first and second gear wheels respectively during operating conditions in such a manner that a rotational force applied to said first gear wheel via said motor is transferred to said second gear wheel via said cable;

a squeegee including:

a planar blade provided with axially opposed upper and lower ends respectively, said blade having a longitudinal length registered parallel with said longitudinal length of said base, said longitudinal length of said blade being equal to said longitudinal length of said base, each of said respective upper and lower ends having a hole monolithically formed therein, each of said holes having a longitudinal length registered parallel with said longitudinal length of said blade, said blade contacting an outer surface of said mirror;

a driven rod provided with axially opposed first and second ends respectively, said rod simultaneously penetrating through said slots of said first and second walls respectively, said first end of said rod being removably attached directly to said upper end of said blade while said second end of said rod is removably attached directly to said lower end of said blade during operating conditions, said rod having a longitudinal axis oriented parallel to said longitudinal length of said blade, said cable being directly attached to a medial portion of said rod and spaced from said blade;

wherein said cable moves said rod along a bi-directional linear path defined by said first and second slots such that said blade is alternately pushed and pulled along a major portion of said outer surface of said mirror during operating conditions;

a switch electrically coupled to said motor, said switch being located within the interior portion of the existing vehicle such that the user can actuate said system from the interior of the existing vehicle; and wherein said motor is electrically coupled to said switch and an existing power source of the vehicle respectively.

2. A self-cleaning vehicle mirror system for removing water, snow and debris from a surface of the vehicle mirror while the user remains positioned within an interior of the vehicle, said self-cleaning vehicle mirror system comprising:

a rigid mounting bracket provided with axially opposed first and second ends respectively, said bracket being provided with monolithically formed first, second, and third sections respectively;

a plurality of coupling plates integrally attached to said first and second ends of said bracket respectively, said coupling plates being directly attached to the exterior of the existing vehicle for supporting said bracket above a ground surface during operating conditions;

a substantially rectangular shaped frame pivotally connected to said third section of said bracket;

a mirror attached directly to said frame;

means for remotely cleaning said mirror, said means being attached to said frame;

wherein said third section of said bracket is located intermediate of said respective first and second sections of said bracket and equidistantly offset from said coupling plates, said third section further having a longitudinal length oriented perpendicular to respective longitudinal lengths of each of said respective first and second sections, said longitudinal length of said third section being greater than said respective longitudinal lengths of said first and second sections respectively while said respective longitudinal lengths of said first and second sections are equal;

wherein each of said coupling plates comprises:

a substantially square-shaped and planar base member, said base member being provided with upper and lower surfaces respectively;

a plurality of threaded apertures formed in opposed corners of said base member and penetrating therethrough, each of said apertures having a centrally registered axis oriented perpendicular to said upper surface of said base member;

a hollow cylindrical tube integrally attached to said upper surface of said base member, said tube being located in a center region of said base member and extending outwardly and away therefrom, said tube having a longitudinal length registered parallel to said centrally registered axis of each of said apertures of said base member, said tube having a diameter that is greater than a diameter of said first and second ends of said bracket respectively such that said respective first and second ends of said bracket statically interfit within an associated one of said tubes during operating conditions;

wherein said tubes prohibit said respective first and second ends of said bracket from prematurely and undesirably separating from said tubes during operating conditions;

wherein said frame comprises:

a planar base having a rear wall and an open front face;

said base including monolithically formed first, second, third, and fourth walls, said walls being located along an outer perimeter of said base and extending away from said base such that a compartment is formed therebetween;

a plurality of linear slots monolithically formed in said first and second walls respectively, said first and second walls being located at opposed longitudinal ends of said base and further having respective longitudinal lengths registered parallel with each other, each of said slots having a longitudinal length registered parallel to said rear wall of said base, each of said slots having a longitudinal length that is less than a lateral width of said base;

a plurality of anchors monolithically formed in said rear wall of said base and extending outwardly therefrom, each of said anchors having a central opening formed therein, each of said anchors having a centrally registered axis oriented parallel with a longitudinal length of said base, each of said anchors being attached to said rear wall of said base at a lateral midpoint thereof, each of said anchors being disposed adjacent to said respective opposed ends of said base and spaced from each other;

wherein said third section of said bracket is pivotally interfitted within each of said anchors such that said third section penetrates said anchors simultaneously and independently during operating conditions;

wherein said base is pivotal about said third section along a fulcrum axis defined along said longitudinal length of said base and about said lateral midpoint of said base;

wherein said mirror interfits within said open front face of said frame, said mirror having an outer perimeter statically abutted against inner surfaces of each of said first, second, third, and fourth walls respectively, said mirror being spaced from said base such that a hollow chamber is formed within a region defined between said mirror and said first, second, third, and fourth walls and said base respectively;

wherein said self-cleaning means comprises:

a reversible power motor housed within said hollow chamber, said motor being directly attached to said inner surface of said fourth wall;

first and second gear wheels, each of said gear wheels having outer circumferences formed in a saw tooth pattern, said first gear wheel being directly and rotatably attached to a bottom end of said motor, said first gear wheel having a bottom surface registered perpendicular to said inner surface of said fourth wall, said second gear wheel being directly and rotatably attached to said inner surface of said third wall and oppositely spaced from said first gear wheel;

a flexible cable looped about each of said first and second gear wheels simultaneously, said cable having a longitudinal length registered parallel to said respective longitudinal lengths of said first and second walls during operating conditions, said cable having an inner surface formed in a saw tooth pattern such that said saw tooth pattern of said cable interfits within said respective saw tooth patterns of each of said first and second gear wheels respectively during operating conditions in such a manner that a rotational force applied to said first gear wheel via said motor is transferred to said second gear wheel via said cable;

a squeegee including:

a planar blade provided with axially opposed upper and lower ends respectively, said blade having a longitudinal length registered parallel with said longitudinal length of said base, said longitudinal length of said blade being equal to said longitudinal length of said base, each of said respective upper and lower ends having a hole monolithically formed therein, each of said holes having a longitudinal length registered parallel with said longitudinal length of said blade, said blade contacting an outer surface of said mirror;

a driven rod provided with axially opposed first and second ends respectively, said rod simultaneously penetrating through said slots of said first and second walls respectively, said first end of said rod being removably attached directly to said upper end of said blade while said second end of said rod is removably attached directly to said lower end of said blade during operating conditions, said rod having a longitudinal axis oriented parallel to said longitudinal length of said blade, said cable being directly attached to a medial portion of said rod and spaced from said blade;

wherein said cable moves said rod along a bi-directional linear path defined by said first and second slots such that said blade is alternately pushed and pulled along a major portion of said outer surface of said mirror during operating conditions;

a switch electrically coupled to said motor, said switch being located within the interior portion of the existing vehicle such that the user can actuate said system from the interior of the existing vehicle; and wherein said motor is electrically coupled to said switch and an existing power source of the vehicle respectively.

* * * * *